United States Patent [19]
Zuta

[11] Patent Number: 5,241,161
[45] Date of Patent: Aug. 31, 1993

[54] SMART CARD INTEGRATED IN A WRISTWATCH AND HAVING LOGIC UNIT CONTROLLING THE AUTOMATIC IDENTIFICATION PROCESS AND THE DATA TRANSFER

[76] Inventor: Marc Zuta, P.O. Box 2162, Petah Tikva, Israel

[21] Appl. No.: 803,333

[22] Filed: Nov. 29, 1991

[30] Foreign Application Priority Data

Dec. 23, 1990 [IL] Israel ................................. 096764

[51] Int. Cl.⁵ ............................................. G04B 47/00
[52] U.S. Cl. ..................................... 235/382; 235/484
[58] Field of Search ............... 235/492, 493, 494, 382

[56] References Cited

U.S. PATENT DOCUMENTS

| | | | |
|---|---|---|---|
| 4,130,738 | 12/1978 | Sandstedt | 179/90 |
| 4,189,712 | 2/1980 | Lemelson | 235/382 |
| 4,403,869 | 9/1983 | Crutcher | 368/10 |

*Primary Examiner*—Carolyn E. Fields
*Assistant Examiner*—Drew A. Dunn

[57] ABSTRACT

A smart card includes a control and logic unit which recognizes an interrogational signal sent to the card and automatically responds by sending an identification code. The interrogational signal is received using a noncontact communication medium in digital, bit-serial form. Input circuits connected to the logic unit convert the received signals to electrical digital input signals. Output circuits connected to the logic unit are used to transmit the identification code using a bit serial, non-contact communication medium. The control and logic unit automatically accepts the information received through the input circuits and stores the information in a writable memory in the card. The information which was stored in the memory during a previous transaction is automatically read and transmitted through the output circuits, together with the identification code. A predefined algorithm contained in the control and logic unit governs the whole process of the interrogational signal recognition, the identification code transmission, the transmission of the previous information which is stored in the memory and the new information reception and storage. The components of the smart card are integrated in a wristwatch casing to protect and conceal the card. The control and logic unit also accepts electrical signals representative of time and date from timing circuits contained in the wristwatch and performs time-dependent algorithms, like limiting the identification function to a predefined period or expiration date. The control and logic unit further accepts user commands and responds by displaying the information stored in the memory or the time and date from the timing circuits.

13 Claims, 3 Drawing Sheets

SMART CARD INTEGRATED IN A WRISTWATCH AND HAVING LOGIC UNIT CONTROLLING THE AUTOMATIC IDENTIFICATION PROCESS AND THE DATA TRANSFER

TECHNICAL FIELD

This invention relates to devices which provide the functions of smart cards used for personal identification and for personal information storage and retrieval, and more specifically to such systems in combination with a wristwatch, and which use a non-contact, optical link to interchange serially transmitted data with a card reader.

BACKGROUND OF THE INVENTION

Heretofore smart cards used a housing similar to old plastic cards, including a microcomputer and battery. Contact with the card reader was through ohmic contacts on the card's surface. However, such prior devices are not in large scale use, because of several problems.

The packaging problem—using a flexible package, like a plastic credit card, results in damage to electronic components inside. A rigid package, on the other hand, is subject to tremendous forces in the pocket or wallet, so it can break. The package has to be hermetically sealed, to protect the electronic parts. But then it is difficult to replace the battery.

Danger of theft—it is well known that the cards attract thieves, cards can be lost. Therefore it is desirable to be able to secure or conceal the card.

The connection to the card reader problem—until now electrical contacts on card's surface were used to transfer information. This method is not reliable, because of dirt or mechanical damage.

The conventional identification device contains a key which is present and readable all the time, while energy is supplied to the device; the key is in the form of a specific shape of a specific resonating frequency or a transmitted code. Unauthorized parties can learn the key and misuse it. The user has manual control over the transmitted code, and selects the code to be transmitted.

Portable random access memory devices known in the art allow the user full access to and control over the stored data. The data transfer and storage is controlled manually. This structure cannot be used in smart cards, because of the sensitivity of the stored data—the user must not be allowed to change the data detailing the approved credit limit, the history of money withdrawals, the number of tickets he/she is entitled to, or the identification code.

A display to the user is needed in addition to the electrical connection to the outside world. There are practical difficulties in adding a display to existing smart cards.

There exists time dependent information, like a credit card limited to a certain period, or delayed payments—therefore a link to a time measuring device is needed.

SUMMARY OF THE INVENTION

In accordance with one aspect of the present invention, a smart card includes means for performing an automatic identification process and an automatic data storage and transfer. The card includes input means for receiving a digital interrogational signal and transferring it to a control and logic unit. The control unit recognizes the interrogational signal and transmits the identification code, according to an automatic, predefined algorithm. The code is transmitted using output means in the card. Data which is received through the input means is transferred to the control unit and is automatically stored in memory means in the card, according to a predefined algorithm. The control unit automatically transfers data in the memory to the output means, to be transmitted out. This structure provides the required security for the identification code and protection for the stored data.

In accordance with another aspect of the invention, the input and output means of the smart card use digital, bit serial, noncontact communication means. In one embodiment of the invention, light waves are used, and the input means is a photodetector; the output means is a liquid crystal device which changes its reflectivity as a function of the transmitted data. These input and output means are used for the identification process and for information transfer. This structure allows for reliable communication with a card reader.

In accordance with a further aspect of the invention, the components of the smart card are integrated with a wristwatch. Mounting the card in a wristwatch case allows to conceal the smart card and to protect it. Integration with the watch circuits connects time and data indicating signals to the control unit, to implement time sensitive functions, like card expiration date. A predefined algorithm is used to disable the identification process after the expiration date.

A non-contact communication link is used between the identification device and a card reader. In the presently preferred embodiment, an optical link is used to achieve a reliable communication channel with the card reader. Electrooptical means in the device generates modulated light waves according to a serial code which represents the identification code and additional, optional information.

This method is resistant to radio frequency interference.

Mounting the device in a wristwatch case solve the packaging problem—a durable case is used to protect the electronic components. The case may be hermetically sealed and can be opened to replace the battery.

The wristwatch's window is transparent to the light waves used by the optical communication channel, at the same time sealing and protecting the electronic circuits. The danger of theft or less is greatly reduced, because the identification device can be concealed as an ordinary wristwatch, and is better kept.

In accordance with another feature of the present invention, timing circuits provide the time and date, which can be displayed through wristwatch's window. A common display is used to display the time or other information which is stored in the identification device. The user can choose which information will be displayed. Time dependent information can be processed in the identification and database device using the time information from the wristwatch circuits.

An optical link from a card reader is used to send additional information to the identification device. This information is stored in the control and logic unit, and is available for display to the user or to be sent to other card reader through the optical link.

Various other features of the method and device of the present invention will become obvious to those skilled in the art upon reading the disclosure set forth hereinafter.

BRIEF DESCRIPTION OF DRAWINGS

Referring to the drawings, which show one example of device in accordance with the present invention.

DETAILED DESCRIPTION OF THE INVENTION

A preferred embodiment of the present invention will now be described by way of example and with reference to the accompanying drawings.

Figure 1:
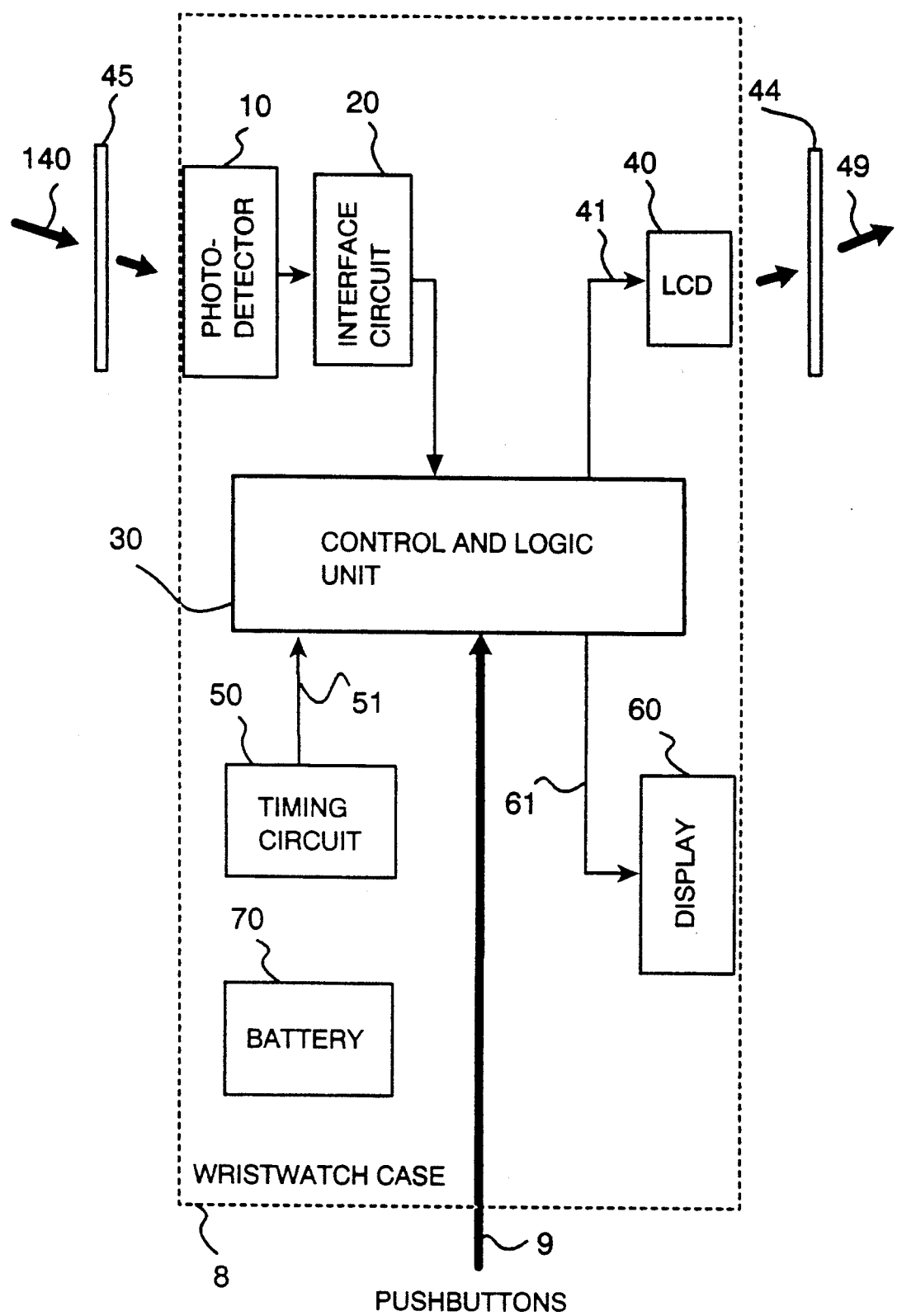
FIG. 1 is an illustration of the electrical structure of the identification device, describing its components and the interrelations between them.

Referring to FIG. 1, the example of one device in accordance with the invention, the smart card includes output means for generating modulated light—the liquid crystal device (LCD) 40, which changes its light reflection properties according to the electrical digital output signal 41.

The card reader (to be described hereinafter) illuminates the liquid crystal device 40. As a result, modulated light waves 49 are generated. These modulated light waves 49 are received by the card reader. This is the optical link from the identification device to the card reader, link used to send the identification code and optional, additional information, as detailed hereinafter. This optical link achieves a reliable communication channel with the card reader. This method is resistant to radio frequency interference and to dirt and mechanical wear.

To provide further protection against optical interference, an optical filter 44 covers the liquid crystal device 40, the filter passing only light in a specific frequency range. Only light in that range will be modulated according to the signal 41, and the card reader is built so as to receive light only in that frequency range.

The control and logic unit 30 contains memory (not shown) to keep the owner's identification code and the circuits to read the code and send it serially coded to the liquid crystal device 40. Unit 30's memory may contain additional fixed data and the information received through the photodetector 10 or information derived from the received information, as detailed hereinafter. The control and logic unit 30 preferably comprises a microcomputer with a CPU and a fixed and a writable memory (not shown).

Unit 30 receives timing signals 51 from the timing circuit 50. The control unit 30 sends electrical signals 61 to the display 60 to display data to the user.

Responding to the user's commands via the pushbuttons 9, unit 30 can display the required information on the display 60.

The wristwatch's case 8 contains all the electronic circuits of the Identification device, timing circuit 50 and a battery 70 to power all the circuits. Mounting the device in a wristwatch case 8 provides a durable housing to protect the electronic components. The case 8 is hermetically sealed and can be opened to replace the battery 70.

Figure 2:
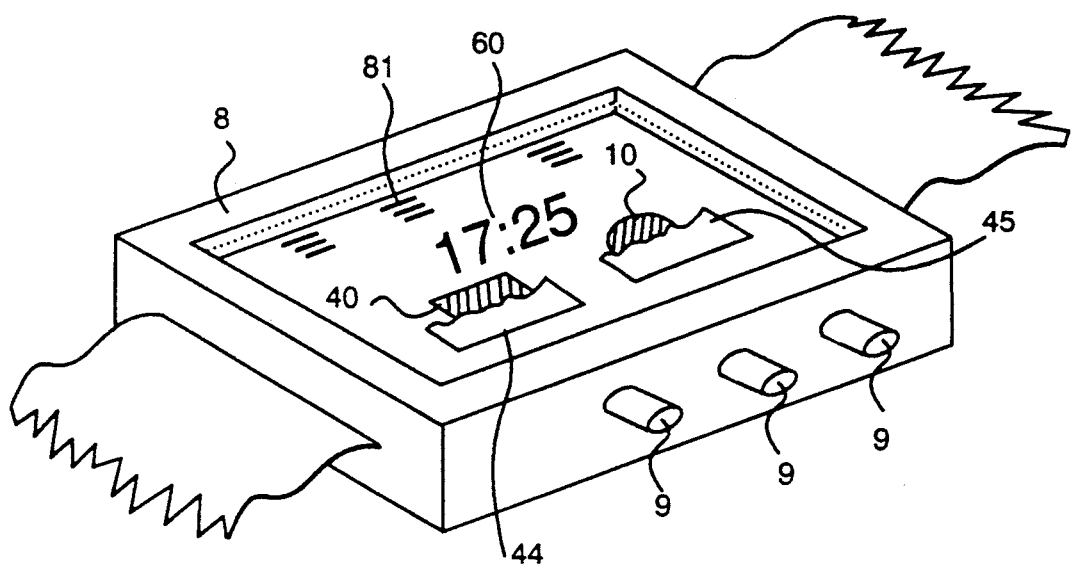
FIG. 2 details the physical structure of the identification device.

FIG. 2 details the physical structure of the identification device. The display 60, the liquid crystal device 40 for transmitting data to the card reader and the photodetector 10 are visible through the window 81 in the wristwatch's case 8.

The transparent window 81 enables the display 60 to be seen by the user and the optical communication channel's light to pass through, at the same time sealing and protecting the electronic circuits, the optical link elements 10, 40 and the display 60 from the harsh outside environment.

Pushbuttons 9 enable the user to interface with the control unit 30 to choose the desired display or for other controls.

The danger of theft or loss is greatly reduced, because the identification device can be concealed as an ordinary wristwatch, and is better kept—it is attached to user's wrist.

In accordance with another feature of the present invention, and referring to FIG. 1, timing circuits 50 provide the time and date, which are sent as electrical signals 51 to the control and logic unit 30.

The common display 60 is used to display the time or date or information received through photodetector 10 or information derived from the received information or other data which are stored in the identification device.

Time dependent information can be processed in control unit 30, thus updating the code transmitted and the data displayed accordingly. For example, after the expiration date of the device the identification code will not be transmitted and the user will be advised to take the necessary actions to renew its validity. Controls 9 can be used to set the time via the control unit 30.

An optical link from the card reader to the identification device is used to send additional information to unit 30. Input means implemented using the photodetector 10 in the identification device receives messages from the card reader, a message being coded as modulated light 140 illuminating the photodetector 10. The photodetector 10 converts the received message to electrical signals, which are converted to digital signals by the interface circuit 20 and are transferred to the control unit 30. The received message may be an interrogational signal or the description of the present transaction, or other data to be stored in the device, for display to the user or to be sent to another card reader through the optical link.

The control and logic unit 30 contains, in addition to the abovementioned components a (not shown) writable memory to contain the received message or data derived from that message, means for deriving the desired data from the message, according to a predefined algorithm, means for writing data into the memory and the circuits to read the additional data and send it serially coded, together with the identification code, to the liquid crystal device 40, and interface circuits to user controls 9 and to display 60.

When the user asks via controls 9 for some information which is stored in control unit 30's memory, then the desired information is transferred to display 60.

Therefore the information in the card can be read by card's owner. This is an advantage over existing cards, where the information is not available to card's owner, but only to card readers.

To provide further protection against optical interference, an optical filter 45 covers the photodetector 10, the filter passing only light in a specific frequency range, corresponding to the wavelength of the optical signals 140 to be received.

Only light in that range will reach the photodetector 10.

The optical communication link may use invisible light—near infrared or ultraviolet. When using invisible light, the optical filters 44, 45 may be opaque to visible light, thus concealing the photodetector 10 and the liquid crystal device 40.

Figure 3:
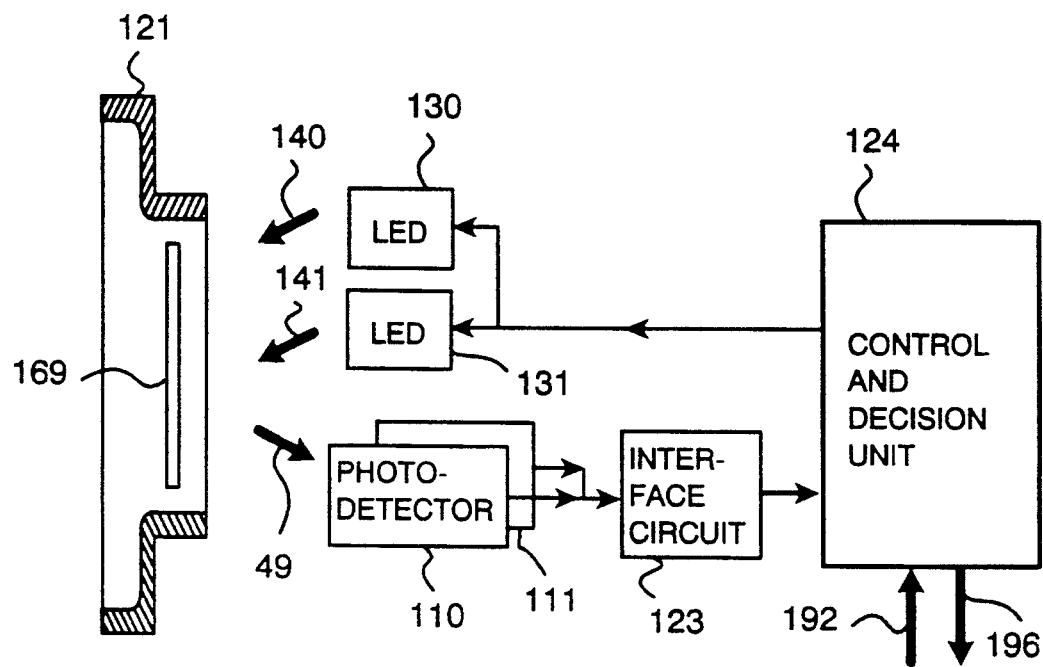
FIG. 3 illustrates the electrical structure of a card reader to be used with the identification device.

FIG. 3 illustrates the electrical structure of the card reader being used with the identification device. Light emitting means 130, 131 (may be more) emit light 140, 141 modulated according to the interrogation code or information being sent to the identification device, or illuminate the liquid crystal device 40, where the light is modulated according to the data sent from the identification device.

The reflected light 49 is received by the photodetectors 110, 111 (may be more), which convert the received message to electrical signals. The signals from all the photodetectors are added together, are converted to digital signals by the interface circuit 123 and are transferred to the control and decision unit 124.

The received message is analyzed in the control and decision unit 124, and a signal 196 is generated, which represents the decision made and other relevant data.

In this preferred embodiment, there is a plurality of light emitting diodes 130, 131 and photodetectors 110, 111, to enable a reliable optical link even when the identification device is held at different angles or positions relative to the card reader, as detailed hereinafter.

Support means 121 holds the wristwatch-shaped identification device in a predefined position relative to means 130, 131, 110, 111 and block extraneous light, to increase optical channels' reliability.

Optical filter 169 is used to transmit and receive a specific narrow range of optical wavelengths compatible to that of filters 44, 45 in the identification device, to block extraneous interfering light.

The unit 124 controls the messages sent to the identification device via the light emitting diodes 125, according to other information received via the channel 192 and other criteria (not described).

Figure 4:
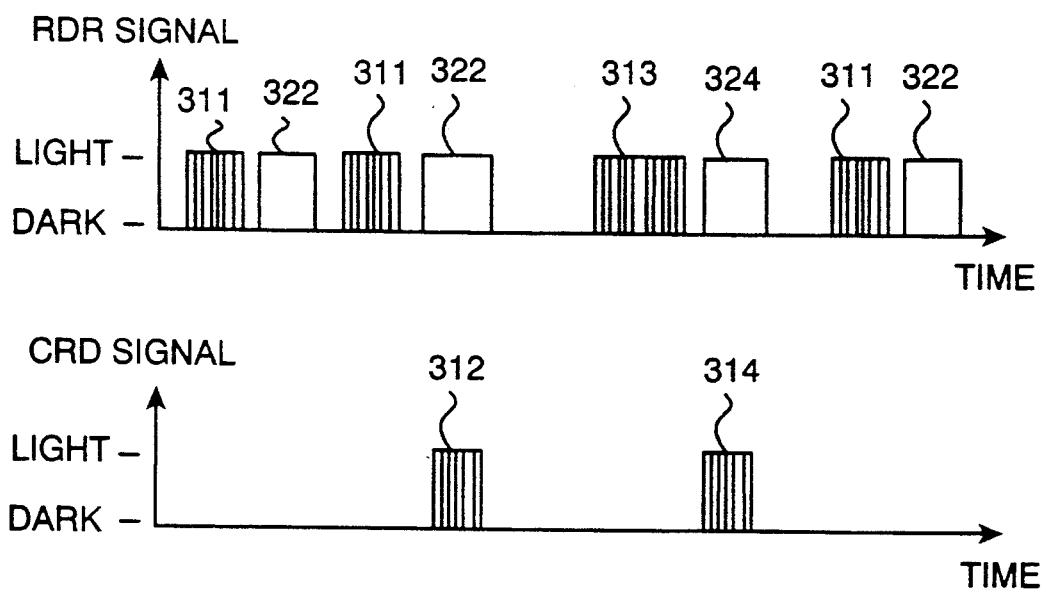
FIG. 4 details the method and stages of a transaction between the identification device and the card reader.

FIG. 4 shows the method and stages of a transaction between the identification device and the card reader, detailing the signals RDR sent by the card reader and the signals CRD sent by the identification device, as a function of time. The interrogational signal 311 is a serial code asking for information stored in the identification device—for example the credit card's identification number, or the remaining sum in the bank account according to the previous transactions, card's expiration date etc. The identification device responds to this interrogational signal 311 by sending the relevant information 312.

When expecting a response, the card reader illuminates the identification device during period 322.

The information 312 is transferred from the control unit 30's memory (see FIG. 1) in the identification device, coded serially, via transmit means 40, using light waves 49. Similarly, messages 311 are received in the identification device through detector means 10.

Referring again to FIG. 4, the information 312 is transferred from the identification device to the card reader, bringing the desired data.

The received message 312 is analyzed in the control and decision unit 124, and a signal 196 is generated, which represents the decision made.

If the data is acceptable to the card reader, the transaction is successfully concluded and the information 313 pertaining to the transaction is sent to the identification device, to update the data kept in the control unit 30's memory.

The description of the present transaction may include the amount paid at the store, the details of the last deposit etc. The identification device may send an acknowledgement and end of session message 314. After a pause the card reader starts sending interrogational signals 311 again, waiting for the next identification device to start a new transaction.

Another embodiment for the means for generating modulated light 40 in the device is to use the same liquid crystal display 60 both as a display and for generating modulated light (FIG. 1). The segments to be displayed to the user are connected to an AC voltage, as usual in a LCD. All the display segments as a whole receive also an ON-OFF signal which represents the code 41.

This code 41 enables the AC voltages to the segments, similar to an AND logic function. Therefore the reflectivity of the display 60 as a whole changes according to code 41. Control unit 30 can compute this function and generate the appropriate signals 61 to display 60, signals which comprise data to be displayed superimposed on the binary code to be transmitted optically. Fast LCDs have to be used.

An alternative embodiment for the means for generating modulated light in the identification device is a light emitting diode as device 40 in FIG. 1, this diode transmitting light pulses according to the electrical signal 41.

The best mode of operation is for the diode to emit light pulses of low duty cycle, to keep low the means current, for long battery life. When using light emitting diode means, there is no need to illuminate the identification device when expecting data to be received from it during period 322. Other type of non-contact communication link may be used between the identification device and a card reader. For example, ultrasonic waves may be used, by mounting ultrasonic transducers (not shown) on wristwatch's case 8. Two transducers may be used, to transmit and receive, respectively, or a common transducer may be used.

A second alternative is the use of an alternate magnetic field for the communication link, by mounting a coil (not shown) in the wristwatch's case 8, so that part of the magnetic flux is emitted outside of case 8. A sensing coil in the card reader can then receive the transmitted message. The coil in the wristwatch can also receive data, to form a two-way channel.

It will be recognized that the foregoing is but one example of an apparatus and method within the scope of the present invention and that various modifications will occur to those skilled in the art upon reading the disclosure set forth hereinbefore.

What is claimed is:

1. A smart card comprising:
   (A) Input means for receiving an interrogational signal or a data signal using a noncontact communication medium in digital, bit-serial form, wherein said input means converts received signals to electrical digital input signals
   (B) Output means for transmitting an identification code or a data message using a noncontact communication medium in digital, bit-serial form, wherein said output means accepts electrical digital output signals at its input and converts said output signals to said identification code and data message;

(C) Control and logic means connected to said input and output means and comprising:
  (1) Means for accepting said electrical digital input signals from said input means;
  (2) Means for recognizing said interrogational signal according to a predefined algorithm, for responding by generating said electrical digital output signals containing said identification code and for transferring said electrical digital output signals to said output means;
  (3) Writable memory means for storing digital data;
  (4) Control means for implementing an automatic data transfer process according to a predefined algorithm, wherein said control means includes means for reading data stored in said writable memory, for generating therefrom said electrical digital output signals containing said data message and for transferring said output signals to said output means, means for extracting data signals from said electrical digital input signals and means for writing said data signals into said writable memory means; and
(D) Wristwatch casing means for containing, protecting and concealing said input means, said output means and said control and logic means therein.

2. The smart card according to claim 1, further including a digital display connected to said control and logic means and timing circuits for generating electrical signals indicative of time and date, wherein said timing circuits are connected to said control and logic means to transfer said electrical signals thereto, and wherein said control and logic means further includes means for accepting user commands and for responding by displaying the information stored in said writable memory means or the time and date from said timing circuits using said display.

3. The smart card according to claim 1, further including timing circuits for generating electrical signals indicative of time and data, wherein said timing circuits are connected to said control and logic means to transfer said electrical signals thereto, and wherein said control and logic means further includes means for limiting the identification function to a predefined period or expiration date.

4. The smart card according to claim 1, wherein said input means include photodetector means for converting optical signals to said electrical digital input signals, and said output means includes liquid crystal device means for generating modulated light in accordance to said electrical digital output signals.

5. The smart card according to claim 1, wherein said input means include ultrasonic transducer means for converting ultrasonic signals to said electrical digital input signals, and said output means include ultrasonic transducer means for generating ultrasonic signals in accordance to said electrical digital output signals.

6. The smart card according to claim 1, wherein said input means include sensing coil means for converting magnetic flux signals to said electrical digital input signals, and said output means include coil means for generating magnetic flux signals in accordance to said electrical digital output signals.

7. The smart card according to claim 4, wherein said photodetector means and said liquid crystal device means operate in the infrared range, further including optical filter means which is transparent in the same infrared wavelength range, wherein said filter means covers said photodetector means and said liquid crystal device.

8. The smart card according to claim 2, wherein said input means include photodetector means for converting optical signals to said electrical digital input signals, said digital display include liquid crystal device means and said output means contain circuits for controlling said display such that selected segments are activated to display said information stored in said writable memory means or said time and date, and wherein said selected segments together further receive a modulating signal according to said electrical digital output signals.

9. The smart card according to claim 2, wherein said control and logic means further includes means for limiting the identification function to a predefined period or expiration date.

10. The smart card according to claim 2, wherein said input means include photodetector means for converting optical signals to said electrical digital input signals, and said output means include liquid crystal device means for generating modulated light in accordance to said electrical digital output signals.

11. The smart card according to claim 3, wherein said input means include photodetector means for converting optical signals to said electrical digital input signals, and said output means include liquid crystal device means for generating modulated light in accordance to said electrical digital output signals.

12. The smart card according to claim 10, wherein said photodetector means and said liquid crystal device means operate in the infrared range, further including optical filter means which is transparent in the same infrared wavelength range, wherein said filter means covers said photodetector means and said liquid crystal device.

13. The smart card according to claim 11, wherein said photodetector means and said liquid crystal device means operate in the infrared range, further including optical filter means which is transparent in the same infrared wavelength range, wherein said filter means covers said photodetector means and said liquid crystal device.

* * * * *